Dec. 29, 1964   D. E. WILLIAMS   3,162,998
SUPERCHARGED INTERNAL COMBUSTION ENGINES
Filed Feb. 7 1964
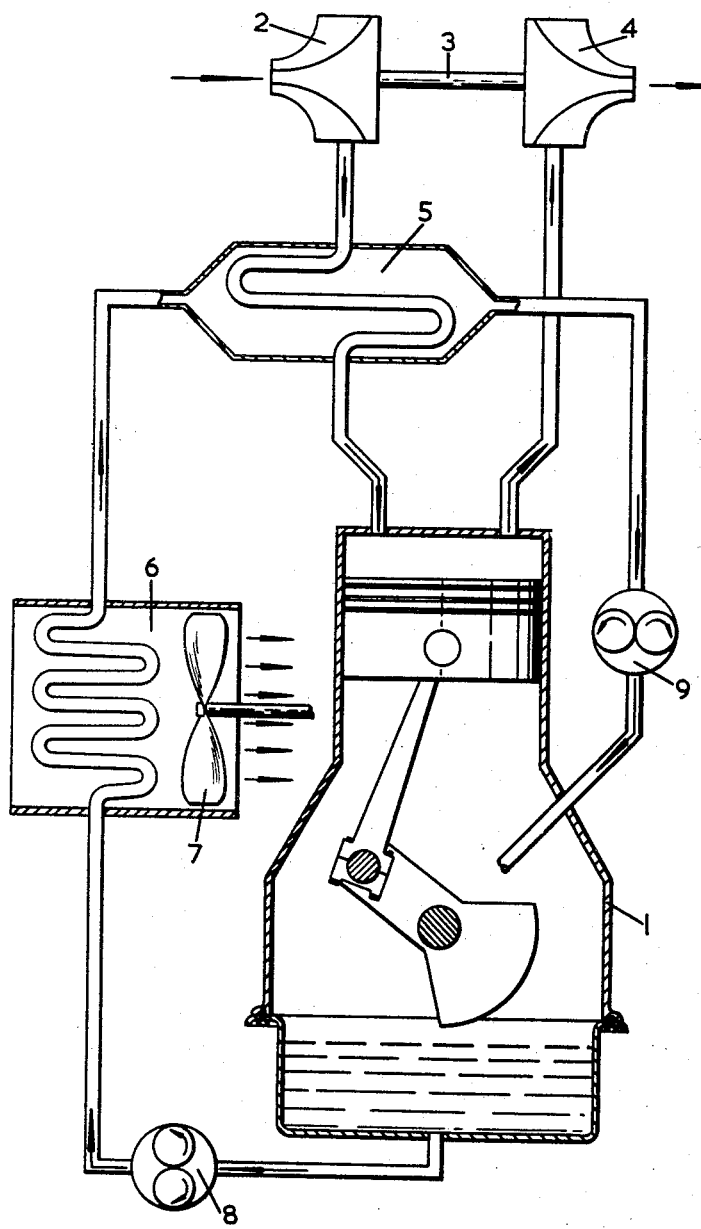
*Inventor*
*By*
*Attorney*

United States Patent Office 3,162,998
Patented Dec. 29, 1964

3,162,998
SUPERCHARGED INTERNAL COMBUSTION ENGINES
David Eyre Williams, % Bristol Siddeley Engines Ltd., Coventry, England
Filed Feb. 7, 1964, Ser. No. 343,378
Claims priority, application Great Britain, Mar. 1, 1963, 8,219/63
5 Claims. (Cl. 60—13)

The invention relates to supercharged internal combustion engines in which the pressure of the charge air to be introduced to the engine is increased from atmospheric pressure to a considerably higher pressure by means of an external compressor. This compression is accompanied by a rise in temperature and unless the charge air were cooled after compression, the increased temperature would offset the effect of increased density of the charge air, produced by the compression. Thus where considerable compression of the charge air is to take place, an intercooler positioned between the compressor and the air inlet to the engine is necessary. Hitherto only intercoolers employing air or water as the cooling medium have been employed for use with supercharged internal combustion engines.

According to the present invention a power plant including an internal combustion engine and a supercharger compressor therefor also includes an intercooler connected between the outlet of the supercharger compressor and the inlet manifold of the engine; an oil cooler connected in a series circuit with the intercooler and the engine, and means for circulating lubricating oil through the said circuit, whereby lubricating oil is removed from the engine, is cooled in the oil cooler, is passed through the intercooler as the coolant medium therefor and is then returned to the engine for lubrication of parts of the latter.

The oil cooler is preferably air-cooled and may include a fan, arranged to be driven by the engine. The air-cooled oil cooler may be of greater thermal capacity, in order to compensate for the extra heat which will be imparted to the oil by the intercooler, than an oil cooler used for cooling oil solely for lubrication.

The means for circulating the lubricating oil may comprise the lubricating oil pump of the engine and, in that case, the pump may be of greater capacity than that normally provided for an engine of similar size and not having an oil-cooled intercooler. Alternatively, at least one additional oil pump may be provided in the said circuit at a position spaced from the engine lubricating oil pump.

One example of a power plant in accordance with the invention will now be described with reference to the accompanying diagram, which shows an air-cooled, compression-ignition, fuel-injection engine 1 and a turbine-driven rotary dynamic supercharger compressor 2, mechanically-coupled by a shaft 3 to a turbine 4 arranged to be driven by the exhaust gases from the engine 1. Between the outlet of the compressor 2 and the inlet manifold of the engine 1, there is connected an intercooler 5, where the charge air is cooled before its introduction to the engine. The intercooler is cooled by lubricating oil which is circulated in a circuit including in series, the engine 1, an air-cooled oil cooler 6 and the intercooler 5.

The oil cooler 6 includes an engine-driven fan 7 and may be an oil cooler normally provided for the engine, in which case the air flow through the cooler would be increased to compensate for the extra heat which would be imparted to the oil by the intercooler. Alternatively, compensation for such extra heat could be effected by using an oil cooler of greater thermal capacity than one which would be required for oil used solely for lubricating purposes.

The oil is circulated by one or more oil pumps. One of these may be the normal lubricating oil pump for the engine and is shown at 8. Another oil pump is shown at 9 at a position between the intercooler 5 and the oil return inlet to the engine; but the additional pump or pumps may be located at any convenient positions in the circuit. Alternatively to providing an additional pump 9 or pumps, the normal pump 8 may be of greater capacity.

In operation of the plant, oil from the engine sump is first of all cooled in the oil cooler 6 to a temperature appropriate for use in the intercooler. The oil is then passed through the intercooler, where the temperature of the charge air is reduced, and is then returned to the parts of the engine to be lubricated and eventually to the engine sump.

The invention may be applied to other types of internal combustion engines which may be provided with other types of supercharger compressors.

The use of intercoolers having lubricating oil as the cooling medium in accordance with this invention has the following advantages:

(1) The same oil circulating pump and oil cooler can be used for both the intercooler and for lubricating the engine, thus leading to simplicity and reduction in cost as compared with the case in which water is used as the cooling medium.

(2) The substitution of oil for water in the intercooler eliminates corrosion and freezing problems due to the use of water as the cooling medium.

(3) In an air-cooled engine, an oil-cooled intercooler is of reduced bulk, weight and cost as compared with an air-to-air intercooler.

What I claim as my invention and desire to secure by Letters Patent of the United States is:

1. A power plant comprising an internal combustion engine; a supercharger compressor therefor; an intercooler connected between the outlet of the supercharger compressor and the inlet manifold of the engine; an oil cooler connected in a series circuit with the intercooler and the engine, and means for circulating lubricating oil through the said circuit, whereby lubricating oil is removed from the engine, is cooled in the oil cooler, is passed through the intercooler as the coolant medium therefor and is then returned to the engine for lubrication of the parts of the latter.

2. A power plant as claimed in claim 1 in which the oil cooler is air-cooled and includes a fan and driving means connected to a driven shaft of the engine.

3. A power plant as claimed in claim 2 in which the oil cooler is of greater thermal capacity, in order to compensate for the extra heat which will be imparted to the oil by the intercooler, than an oil cooler used for cooling oil solely for lubrication.

4. A power plant comprising an internal combustion engine, a supercharger compressor therefor, an intercooler connected between the outlet of the supercharger compressor and the inlet manifold of the engine; an oil cooler connected in a series circuit with the intercooler and the engine, and at least one lubricating oil circulating pump, whereby lubricating oil is removed from the engine, is cooled in the oil cooler, is passed through the intercooler as the coolant medium therefor and is then returned to the engine for lubrication of parts of the latter.

5. A power plant comprising an air-cooled, compression-ignition, fuel-injection engine, a rotary dynamic supercharger compressor therefor, a turbine arranged to be driven by the exhaust gases of the engine and mechanically coupled to drive the compressor, an intercooler connected between the outlet of the supercharger compressor and the inlet manifold of the engine; an oil cooler connected in a series circuit with the intercooler and the engine, and means for circulating lubricating oil through the said circuit, whereby lubricating oil is removed from the engine, is cooled in the oil cooler, is passed through the intercooler as the coolant medium therefor and is then returned to the engine for lubrication of parts of the latter.

References Cited by the Examiner

UNITED STATES PATENTS

| | | | |
|---|---|---|---|
| 1,369,558 | 2/21 | Sherbondy | 123—119 |
| 1,536,499 | 5/25 | Horvath | 123—41.33 |
| 1,612,053 | 12/26 | Restany | 60—13 |
| 2,159,422 | 5/39 | Buchi | 60—13 |
| 2,292,233 | 8/42 | Lysholm | 60—13 |
| 2,346,463 | 4/44 | Szekely | 123—119 X |
| 2,529,984 | 11/50 | Wiederkehr et al. | 60—13 X |
| 3,091,228 | 5/63 | Maxwell | 123—119 |
| 3,134,371 | 5/64 | Crooks | 123—119 X |

FOREIGN PATENTS

| | | |
|---|---|---|
| 369,033 | 3/32 | Great Britain. |

RICHARD B. WILKINSON, *Primary Examiner.*

UNITED STATES PATENT OFFICE
CERTIFICATE OF CORRECTION

Patent No. 3,162,998 December 29, 1964

David Eyre Williams

It is hereby certified that error appears in the above numbered patent requiring correction and that the said Letters Patent should read as corrected below.

In the grant, lines 1 to 3, for "David Eyre Williams, of Coventry, England," read -- David Eyre Williams, of Coventry, England, assignor to Bristol Siddeley Engines Limited, of Bristol, England, --; line 12, for "David Eyre Williams, his heirs" read -- Bristol Siddeley Engines Limited, its successors --; in the heading to the printed specification, lines 4 and 5, for "David Eyre Williams, % Bristol Siddeley Engines Ltd., Coventry, England" read -- David Eyre Williams, Coventry, England, assignor to Bristol Siddeley Engines Limited, Bristol, England --.

Signed and sealed this 4th day of May 1965.

(SEAL)
Attest:

ERNEST W. SWIDER
Attesting Officer

EDWARD J. BRENNER
Commissioner of Patents